Jan. 24, 1961

R. M. SILVERMAN 2,969,242

DICTATING MACHINE

Filed Feb. 13, 1959

2 Sheets-Sheet 1

INVENTOR.
ROBERT M. SILVERMAN
BY
George H. Fritzinger
AGENT

Jan. 24, 1961 R. M. SILVERMAN 2,969,242

DICTATING MACHINE

Filed Feb. 13, 1959 2 Sheets-Sheet 2

INVENTOR.
ROBERT M. SILVERMAN

BY George H. Fritzinger

AGENT

United States Patent Office 2,969,242

Patented Jan. 24, 1961

2,969,242

DICTATING MACHINE

Robert M. Silverman, Springfield, N.J., assignor to McGraw-Edison Company, Elgin, Ill., a corporation of Delaware Filed Feb. 13, 1959, Ser. No. 793,196

11 Claims. (Cl. 274—46)

This invention relates to dictating machines which record by the embossing method, and more particularly it relates to an improvement in such dictating machines which will cause each separate recording to start in such manner as will assure a positive feed-in of the reproducer stylus into the groove proper when each recording is reproduced.

Recordings made by the embossing method are characterized by a ridge or so-called "horn" along each side edge of the groove, which because of the pitch separation between successive grooves or groove convolutions produces a raised furrow between adjacent grooves. When such recording is reproduced, the reproducer stylus is typically fed from a blank record area into the recorded area but as the reproducer stylus approaches the recorded area it may not feed into the groove proper at the start of the first groove convolution but may come instead against the outer horn of some intermediate portion of the first convolution and start reproducing the recorded signal at a low level with high distortion known as "shadow voice." As the reproducer stylus passes the start of the first groove convolution it still may not enter the groove proper but may enter instead the intergroove furrow to continue to reproduce a shadow voice. This may continue until some jarring force is applied to displace the stylus out of the intergroove furrow into the groove proper.

An object of the present invention is to provide improvements in dictating machines which will assure that when a recording from the machine is reproduced it will be picked up cleanly from the start without any prior shadow voice.

A further object is to start each separate recording with a groove of increased width formed under controlled conditions over a predetermined length of the groove so that the reproducer stylus will be guided positively into the groove proper at the start of the first groove convolution.

Another object is to start the first groove convolution of each separate recording with an increased width equal at least to the groove pitch.

Another object is to provide a dictating machine with an automatic mechanism responsive to the lowering of the recorder stylus onto the record for initially increasing the bias of the recorder stylus on the record and concurrently starting the drive mechanism.

Another object is to provide such automatic mechanism with timing means for stopping the drive mechanism after a predetermined interval and placing the drive mechanism under control of a manual start-stop device.

Further objects of the invention are to provide simple and economical mechanisms for carrying out the aforestated objectives. In the description of the invention, reference is had to the accompanying drawings, of which:

Figure 8 is a schematic circuit diagram of the control circuitry for the second embodiment just referred to.

Figure 1:
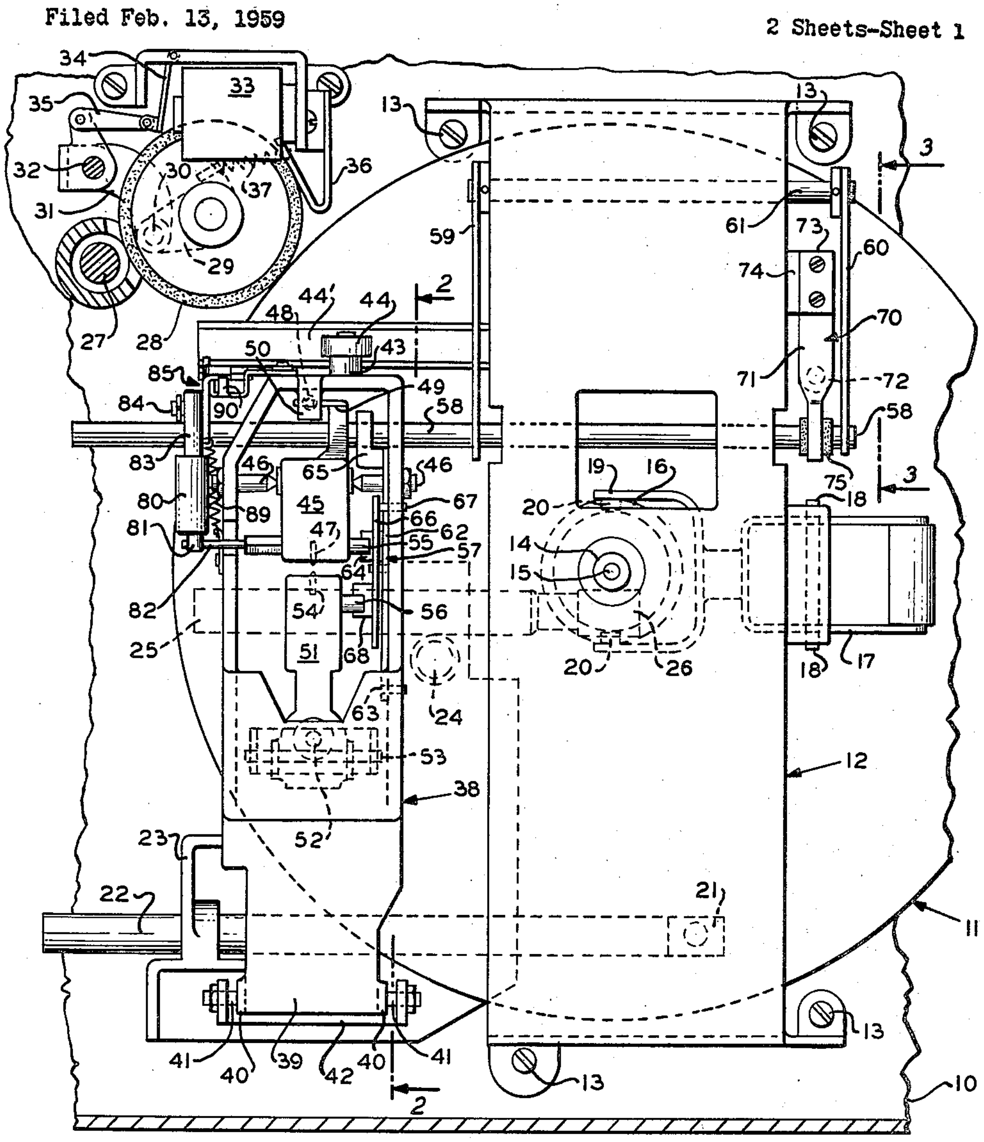
Figure 1 is a fractional top plan view of a recording machine incorporating the invention.
Figure 2:
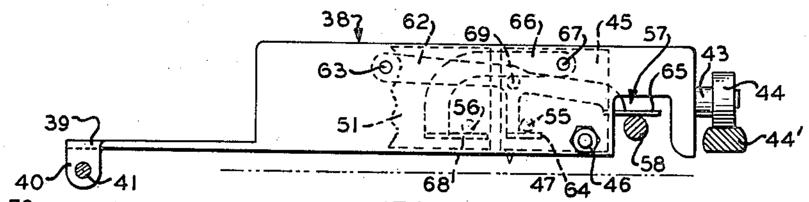
Figure 2 is a side elevational view of the main carriage as seen from the line 2—2 of Figure 1 showing the left rod raised to hold the recorder from the record.

The present invention is shown by way of preferred illustration as being incorporated in a type of dictating machine disclosed in the Somers' Application Serial No. 347,875, filed April 10, 1953, now Patent No. 2,866,647, issued Dec. 30, 1958 having common ownership with the present application and to which reference may be had for specific details. For present purposes such machine need be only partially described.

The machine comprises a base member 10 onto which a turntable 11 is journaled. A bridge 12 overlies the turntable diametrically thereof and is secured at its ends to the base member by means of screws 13. On this bridge axially in line with the turntable is a bearing 14 rotatably receiving a plunger rod 15 which carries a record clamping member 16 at its lower end. The plunger rod is movable up and down by a transverse U-shaped member 17 pivoted at 18 to the right side of the bridge 12 and having a fork 19 at its inner end provided with diametrically opposite pins 20 which engage slidably a groove in the record clamping member 16. Thus, by rocking the member 17 the record clamp can be engaged and disengaged.

On the front portion of the base member 10 there is a pair of standards, one of which is indicated at 21, which support a front cross rod 22. A similar parallel cross rod (not shown) is supported at the central portion of the base member. Slidably mounted on these cross rods is a sub-carriage 23. Carried by the sub-carriage is a circular feed nut 24 which meshes with a feed screw 25. The feed screw is supported rotatably (by means not shown) in parallel relation to the aforestated cross rods, and has a worm wheel 26 at one end meshing with a worm gear (not shown) on the shaft of the turntable. The circular feed nut is frictionally restrained so that as the turntable is driven the sub-carriage is moved progressively along a radial line of the turntable. The drive of the turntable is from a power driven shaft 27 through a friction wheel 28 frictionally engaging the rim of the turntable. The friction wheel is journaled to a link 29 which is pivoted at 30 to a bell crank lever 31 itself pivoted to a stud 32 on the base member. A clutch solenoid 33 is bracketed to the base member and has an armature 34 connected by a link 35 to the bell crank lever. When the clutch solenoid is not energized, the friction wheel is held disengaged from the drive shaft and engaged with a stop lug 36 by a spring 37 to hold it and the turntable at standstill. When the solenoid is energized the friction wheel is propelled from the stop lug into engagement with the drive shaft to start rotation of the turntable.

A main carriage 38 overlies the turntable and is formed as a hollow generally rectangular casting provided with a front extension 39. This extension has a pair of downwardly extending lugs 40 which are apertured to receive respective trunnions 41. The trunnions are threaded through respective arms of a U bracket 42 mounted on the front apron of the sub-carriage. Secured to the rear end of the main carriage is a stud 43 on which a roller 44 is journaled. This roller rides on a cross rod 44' which projects laterally from the bridge 12. Thus the main carriage rides on the rod 44' at its rear end and is hinged to and propelled by the sub-carriage at its forward end.

A recorder 45 is mounted within the rearward portion of the carriage on a pair of cone pivots 46 threaded through the side walls. The recorder has a stylus 47 at its forward end for engaging a record mounted on the turntable. The recorder is biased to exert a substantial pressure of the stylus against the record partially by the weight of the recorder and partially by a tension spring 48 connected between a tail piece 49 on the recorder and a tab 50 overhanging the rear wall of the main carriage.

A reproducer 51 is mounted within the front portion of the main carriage for universal (lateral and vertical) freedom of movement. Lateral movement is permitted by a pivot pin 52 and vertical movement by a pivot pin 53. The reproducer has a stylus 54 at its rear end for engaging the record under the influence of its own weight. In the normally centralized position of the reproducer the stylus thereof engages the record a short trailing distance behind the recorder stylus with respect to the direction of advance of the carriage.

The recorder and reproducer have laterally extending pins 55 and 56 at their free end portions by which they may be lifted from the record. Lifting is done through a lever mechanism 57 mounted on the right wall of the main carriage and operable by a lift rod 58 that extends parallel to the path of the carriage. The lift rod is mounted for up and down movement on parallel arms 59 and 60 secured to a shaft 61 journaled in the bridge 12. The lever mechanism 57 comprises a long lever 62 pivoted at 63 to the front portion of the carriage. This lever has intermediately thereof a lift finger 64 which extends below the pin 55 on the recorder, and it has a finger 65 at its rearward end which overlies the lift rod 58. Also, the lever mechanism comprises a relatively short lever 66 pivoted at 67 to the rearward portion of the carriage and provided with the lift finger 68 which extends below the pin 56 of the reproducer. A pin 69 on the lever 62 lies below the lever 66 and serves to raise the latter as the lever 62 is raised by the lift rod. The timing of the two levers 62 and 66 is such that if the lift rod 58 is raised to an intermediate position only the recorder is raised from the record, but when raised to an uppermost position the reproducer as well as the recorder are lifted from the record. Control of the lift rod is by any suitable mechanism not herein necessary to show.

Figure 3:
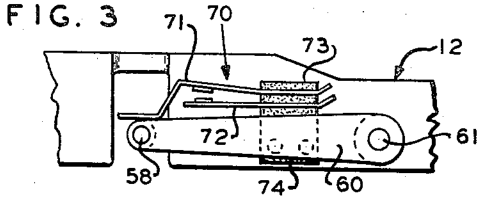
Figure 3 is a fractional vertical sectional view on the line 3—3 of Figure 1 showing a control switch in the position it occupies when the left rod is raised.

At the right side of the bridge 12 near the rearward end thereof is a switch 70 (see Figure 3) comprising a pair of switch blades 71 and 72 mounted insulatedly in a stack 73 carried by a bracket 74 on the bridge. The switch blades are biased closed but the upper blade 71 extends forwardly across the lift rod 58 so that when the lift rod is in its raised position it holds the switch 70 open but allows this switch to close within the first portion of the downward movement of the lift rod to its lowermost position. An insulating sleeve 75 on the lift rod insulates the switch from the latter. This switch is used to control the drive clutch in connection with my invention as will appear.

Figure 4:
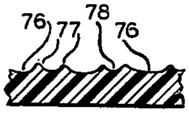
Figure 4 is a fractional sectional view through the record body at right angles to the groove convolutions showing the form of groove proper and intergroove furrow produced when a record body is recorded upon by the embossing method.

When a recording is made by the embossing method the groove is formed in the record material—which may for example be Vinylite—by displacing material from the center of the groove to each side thereof and forming side ridges or horns as hereinbefore described. Since the groove is in the form of a spiral due to the progressive movement of the carriage as the turntable is rotated, there will be successive groove convolutions 76 as shown in Figure 4. Between successive groove convolutions there will be two raised horns 77 separated by an indentation of a fractional width of that of each groove and forming thus a raised furrow 78. When a recording is to be reproduced the reproducer stylus is lowered onto a blank surface of the record ahead of the recorded area and fed gradually into the latter by the progressive advance of the carriage as the record is rotated. As the reproducer stylus approaches the recorded area it may pass the start of the first groove convolution and come against the outer horn of some intermediate portion of this first convolution and be modulated at a low level with considerable distortion to reproduce the so-called shadow voice. Worse still, as the reproducer stylus next passes the start of the first convolution it may enter the intergroove furrow and continue to reproduce the shadow voice until the stylus is dislodged by some force into the groove proper.

By the present invention rotation is started the instant the recorder stylus is lowered onto the record and the recording stylus is caused to have an abnormally high pressure in the first instance which may be gradually reduced, and after the stylus has engaged the record, the rotation thereof is automatically stopped after a predetermined time interval. By so controlling the recording stylus in a manner independently of how or with what speed it is lowered onto the record, it is assured that the first groove convolution will from the start have an increased width over a predetermined length of the groove. Preferably, the initial pressure is set so that the groove will start with a width equal at least to the groove pitch. Such increased groove width at the start of the first groove convolution assures that as the reproducer stylus is fed gradually into a recorded area it will be guided into the regular groove at the start of the first convolution before it reaches the outer horn of any intermediate portion thereof. Thus, the recorded matter is reproduced clearly from the beginning at full level without tracking distortion and without any prior shadow voice, and will continue as such because once the reproducer stylus is started in the groove proper it will continue to track the same.

Figure 5:
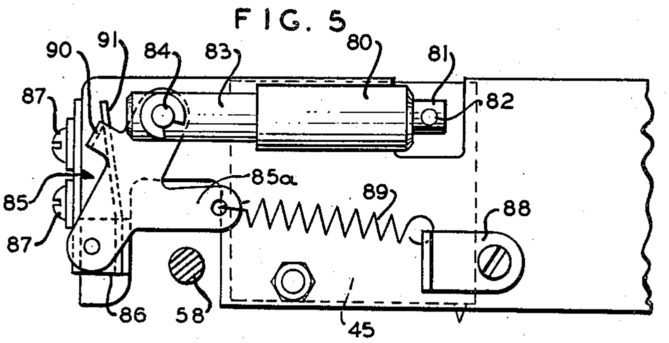
Figure 5 is a lefthand elevational view of the rearward portion of the main carriage showing applied thereto a preferred embodiment of the invention for initially increasing the stylus pressure when the recorder head is lowered onto the record.

The invention is carried out preferably by means of a spring-urged dashpot mechanism such as is shown in Figure 5. This mechanism comprises a dashpot 80 having an apertured ear 81 at one end of its casing received loosely by a side pin 82 on the upper front or free end portion of the recorder head. The dashpot has a plunger 83 extending from its other end which is pivotally connected at 84 to the upper end of a bell crank lever 85 pivoted at its lower end to a bracket 86 secured by screws 87 to the back end of the main carriage. The bell crank lever has a forwardly extending arm 85*a* overlying the lift rod 58. Connected between this arm and a bracket 88 on the side of the main carriage is a tension spring 89 which urges the lever 85 forwardly in a direction to close the dashpot. An ear 90 turned over from the back of the lever 85 engages an adjustable arm 91 on the bracket 86 to provide a stop for the lever. The operation of this mechanism is as follows:

When the lift rod 58 is raised it not only lifts the recorder from the record through the lever mechanism 57 as before described, but it also engages the arm 85*a* and swings the bell crank lever rearwardly with a proportionally greater movement than that of the recorder head to cause the plunger 83 to be withdrawn from the casing of the dashpot. When the lift rod is subsequently lowered to free the recorder for movement onto the record not only are the normal biasing forces effective to move the recorder head with pressure against the record but also there is at the first instant the force of the tension spring 89 operating on the recorder head through the bell crank lever 85 and the dashpot 80 to increase the pressure of the recorder stylus on the record. The dashpot 80 yields to the force of the spring 89 until the bell crank lever 85 comes against its stop 91, but until the stop 91 is reached the spring 89 exerts an additional biasing force of diminishing magnitude onto the recorder head. After the bell crank lever reaches its stop the latter takes up the force of the spring 89, leaving thereupon only the normal biasing forces on the recorder. In order that the recorder may have some vertical freedom of movement to follow an uneven record surface without bringing the supplementary biasing into play after the bell crank lever has come against its stop, the dashpot is connected to the recorder at 81—82 with a loose pivot.

Figure 6:
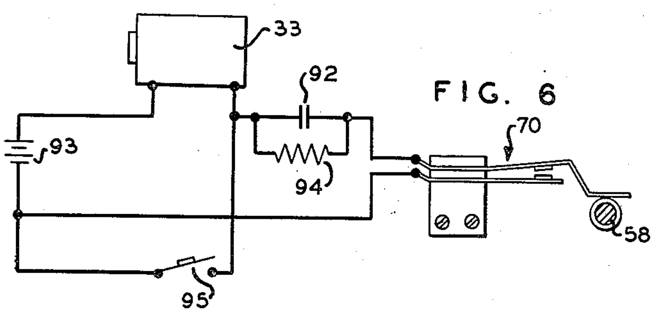
Figure 6 is a schematic circuit diagram of the control circuitry for the embodiment of Figure 5.

In order that the supplementary biasing force supplied at the first instant onto the recorder as the recorder is lowered onto the record will be distributed over a predetermined length of groove, record rotation is started as an incident prior to the recorder stylus being lowered onto the record. To this end the clutch solenoid 33 is connected through a condenser 92 and the switch 70 to a D.C. source 93 of voltage as shown in Figure 6. Since the switch 70 is closed by the initial lowering movement of the lift rod 58 and the recorder stylus is not engaged with the record until the lift rod reaches the final portion of its downward movement this drive clutch is engaged on or before the time the recorder stylus engages the record. The condenser 92 has such capacity as will cause the clutch solenoid to be held operated only for a desired initial period. As typical values, the normal bias force of the recorder on the record may be 60 gr., the dashpot mechanism may be adapted to increase this bias by an additional 60 gr. at the beginning and may be set to run out in about .1 second, and the condenser 92 may be set to hold the drive clutch engaged for about .2 second. A high resistor 94 may shunt the condenser 92 to assure that the condenser will be fully discharged when the switch 70 is again opened by the raising of the lift rod 58. Normal start-stop operation of the clutch solenoid during recording of dictation may be controlled by a push switch 95 as shown in Figure 6.

Figure 7:
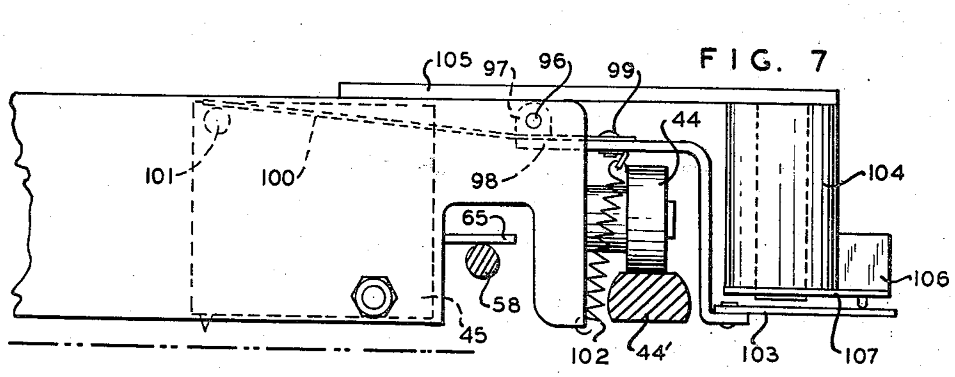
Figure 7 is a righthand view of a rear portion of the main carriage showing attached thereto an alternative embodiment of the invention.
Figure 8:
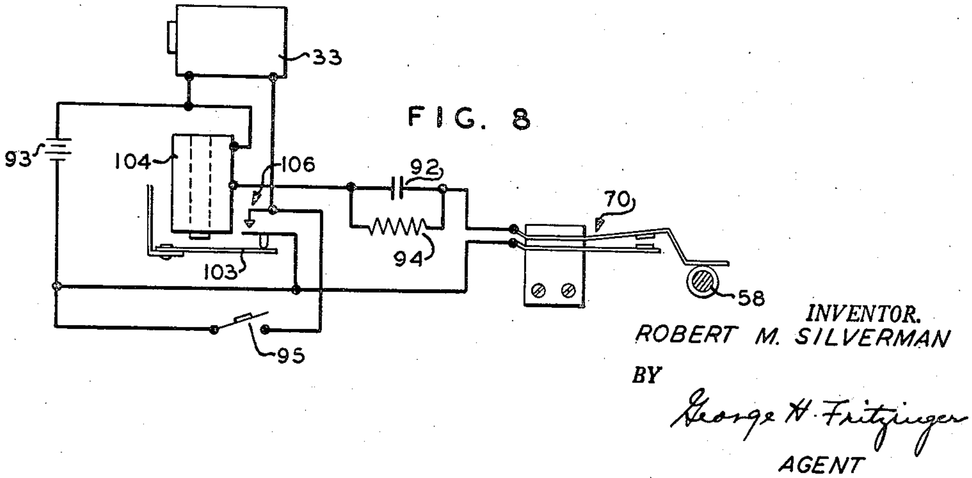

In an alternative embodiment shown in Figure 7, the back end of the main carriage carries a cross pin 96 onto which are pivoted a pair of upturned apertured lugs 97 of a front to back extending lever 98. Riveted at 99 to a portion of this lever back of the pivot axis 96 is a leaf spring 100 which extends forwardly across a side pin 101 on the recorder. The lever is biased clockwise by a tension spring 102 connected between the lever and the main carriage. At the back of the support rod 44′ the lever 98 is offset downwardly and provided with a magnetic armature 103 at about the level of the bottom of the main carriage. Directly above the armature is an electromagnet 104 carried by a rearwardly extending mounting plate 105 on the main carriage. When the electromagnet is energized the lever 98 is rocked counterclockwise to exert a downward force on the recorder through the leaf spring 100. Also, as the electromagnet is energized its armature operates a pushbutton switch 106 mounted on an end plate 107 of the electromagnet. This switch controls the clutch solenoid as shown in Figure 8. For example, the switch 70 and condenser 92 are connected in this case serially with the electromagnet 104, in place of the solenoid 33 as in Figure 6, and the switch 106 is connected in the circuit of the clutch solenoid 33. Thus, when the lift rod 58 is lowered the electromagnet 104 is energized for a period of from .1 to .2 seconds as is also the clutch solenoid to cause a short groove length at the start of the first groove convolution to have an increased width. Thereafter, a start-stop operation of the record disk is controlled by the manual switch 95.

The particular embodiments of my invention herein shown and described are intended to be illustrative and not necessarily limitative of my invention since the same are subject to changes and modifications without departure from the scope of my invention which I endeavor to express according to the following claims.

I claim:

1. In a phonographic recording machine: the combination of a support for a record; a recorder head having a stylus for engaging a supported record and recording thereon by the embossing method in side-by-side grooves; control means for shifting said stylus into and out of engagement with the record; means for providing a normal bias force of the recorder stylus on the record when said control means is in record position; and supplementary bias means responsive to said shifting means as the stylus is moved into engagement with the record for initialling increasing the stylus pressure on the record by a predetermined amount.

2. The combination set forth in claim 1 wherein said supplementary biasing means includes timing means for causing said increased stylus pressure to be applied only for a predetermined interval following engagement of the recorder stylus with the record.

3. The combination set forth in claim 1 wherein said supplementary biasing means includes means for reducing the increased bias pressure to zero within a predetermined time interval.

4. In a phonographic recording machine: the combination of a support for a record; a recorder head having a stylus for engaging a supported record and recording thereon by the embossing method in side-by-side grooves; control means movable into and out of record position for shifting said stylus into and out of engagement with the record; means for providing a normal bias force of the recorder stylus on the record when said control means is in record position; drive means for producing a relative progressive movement between said recorder head and said supported record; and means responsive to said shifting means as said recorder stylus is moved into engagement with the record for increasing the stylus pressure by a predetermined amount and for concurrently starting said drive means.

5. The combination set forth in claim 4 wherein said last-stated means includes timing means for removing said increased stylus pressure and stopping said drive means within a predetermined time interval following engagement of the recorder stylus with the record.

6. The combination set forth in claim 5 wherein said last-stated means includes means for reducing the increased stylus pressure substantially to zero and for stopping said drive means in the sequence here named.

7. In a phonographic recording machine: the combination of a movable support for a record; a recorder head having a stylus for engaging a supported record and recording thereon by the embossing method; drive means for moving said record support and concurrently progressively advancing said recorder head to cause said recorder stylus to engage the record along a series of successive groove convolutions; control means movable into and out of record position for shifting said recorder stylus into and out of engagement with the record; means for providing a normal bias force of the recorder head on the record when said control means is in record position; means for applying an additional bias force on said recorder head and for causing said drive means to run for a predetermined time interval responsive to said control means as the same is shifted into record position; and manual means operative after elapse of said predetermined time interval for starting and stopping said drive means at will without altering the bias force of said recorder head on the record.

8. The combination set forth in claim 7 including spring means, a dashpot, means for transmitting force from said spring means through said dashpot to said recorder head responsive to shifting said control means to record position whereby to increase the force of the recorder head on the record; and stop means for absorbing the force from said spring means whereby to reduce the bias force to normal when said dashpot has yielded a predetermined distance.

9. The combination set forth in claim 8 including a start-stop solenoid; an energizing circuit for said solenoid including a condenser for causing said solenoid to be energized for predetermined time interval when said circuit is connected to a source of direct current; and means for so connecting said circuit responsive to shifting said control means to record position.

10. The combination set forth in claim 7 including an electromagnet having a movable armature; a yieldable transmission between said armature and recorder head for increasing the bias force of said head on the record when said electromagnet is energized; a circuit for supplying direct current to said electromagnet, said circuit serially including a condenser for causing the electromagnet to be energized for a predetermined time interval following closure of said circuit; and means for closing said circuit responsive to shifting said control means into record position.

11. The combination set forth in claim 10 including a switch operable by said electromagnet for controlling said drive means.

References Cited in the file of this patent

UNITED STATES PATENTS

| | | |
|---|---|---|
| 1,483,751 | Singland | Feb. 12, 1924 |
| 2,112,699 | Kleber | Mar. 29, 1938 |